(12) United States Patent
Takahashi et al.

(10) Patent No.: US 12,517,094 B2
(45) Date of Patent: Jan. 6, 2026

(54) PROCESSING DEVICE, PROCESSING SYSTEM, PROCESSING METHOD, AND STORAGE MEDIUM

(71) Applicant: KABUSHIKI KAISHA TOSHIBA, Tokyo (JP)

(72) Inventors: Hiromasa Takahashi, Tokyo (JP); Masahiro Saito, Yokohama (JP); Yasunori Chiba, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 450 days.

(21) Appl. No.: 18/060,752

(22) Filed: Dec. 1, 2022

(65) Prior Publication Data

US 2023/0104515 A1    Apr. 6, 2023

Related U.S. Application Data

(63) Continuation of application No. PCT/JP2021/021511, filed on Jun. 7, 2021.

(30) Foreign Application Priority Data

Jun. 8, 2020    (JP) ................. 2020-099282

(51) Int. Cl.
*G01N 29/44*    (2006.01)
*G01N 29/04*    (2006.01)
*G01N 29/11*    (2006.01)
*G01N 29/24*    (2006.01)
*G01N 29/26*    (2006.01)
*G01N 29/48*    (2006.01)

(52) U.S. Cl.
CPC ......... *G01N 29/4427* (2013.01); *G01N 29/04* (2013.01); *G01N 29/11* (2013.01);
(Continued)

(58) Field of Classification Search
CPC .... G01N 29/4427; G01N 29/04; G01N 29/11; G01N 29/24; G01N 29/262; G01N 29/48;
(Continued)

(56) References Cited

U.S. PATENT DOCUMENTS 4,482,889 A    11/1984   Tsuda et al.
5,269,188 A *  12/1993   Esin .................... G01N 29/024
                                                        73/1.02
(Continued)

FOREIGN PATENT DOCUMENTS

CN    1 045 658 C      10/1999
CN    110402388 A      11/2019
(Continued)

OTHER PUBLICATIONS

WO-2021167835-A1, English Translation (Year: 2021).*
(Continued)

*Primary Examiner* — Ryan D Walsh
(74) *Attorney, Agent, or Firm* — Oblon, McClelland, Maier & Neustadt, L.L.P.

(57) ABSTRACT

According to one embodiment, a processing device receives a detection result of an intensity of a reflected wave detected by a detector including a detecting part that transmits an ultrasonic wave and receives the reflected wave, and a propagating part through which the ultrasonic wave and the reflected wave propagate, and performs a first determination of determining a state of the detecting part and a second determination of determining a state of the propagating part based on the detection result.

18 Claims, 15 Drawing Sheets

(52) U.S. Cl.
CPC ........... *G01N 29/24* (2013.01); *G01N 29/262* (2013.01); *G01N 29/48* (2013.01); *G01N 2291/044* (2013.01); *G01N 2291/106* (2013.01); *G01N 2291/267* (2013.01)

(58) Field of Classification Search
CPC ....... G01N 2291/044; G01N 2291/106; G01N 2291/267
See application file for complete search history.

(56) References Cited

U.S. PATENT DOCUMENTS

| 2015/0135799 | A1 |   | 5/2015 | Yamano et al. |
| 2020/0003735 | A1 |   | 1/2020 | Ushijima et al. |
| 2020/0149979 | A1 |   | 5/2020 | Roth, II et al. |
| 2021/0086282 | A1 | * | 3/2021 | Saito .................... B23K 31/125 |

FOREIGN PATENT DOCUMENTS

| CN | 111065918 A | 4/2020 |
| DE | 10 2018 213 372 A1 | 2/2020 |
| EP | 0 945 725 A1 | 9/1999 |
| JP | 55-10572 A | 1/1980 |
| JP | 57-93271 A | 6/1982 |
| JP | 10-227769 A | 8/1998 |
| JP | 10-262967 A | 10/1998 |
| JP | 2009-2832 A | 1/2009 |
| JP | 2010-19777 A | 1/2010 |
| JP | 2010-243375 A | 10/2010 |
| JP | 2013-245956 A | 12/2013 |
| JP | 2015-97619 A | 5/2015 |
| JP | 2019-37642 A | 3/2019 |
| JP | 2019-90727 A | 6/2019 |
| JP | 6570600 B2 | 9/2019 |
| WO | WO-2021167835 A1 * | 8/2021 | ........... G01N 29/043 |

OTHER PUBLICATIONS

International Search Report issued Aug. 24, 2021 in PCT/JP2021/021511 filed on Jun. 7, 2021, 3 pages.
Combined Chinese Office Action and Search Report issued Mar. 26, 2025, in corresponding Chinese Patent Application No. 202180040697.3 (with English Translation and English Translation of Category of Cited Documents), 22 pages.

* cited by examiner

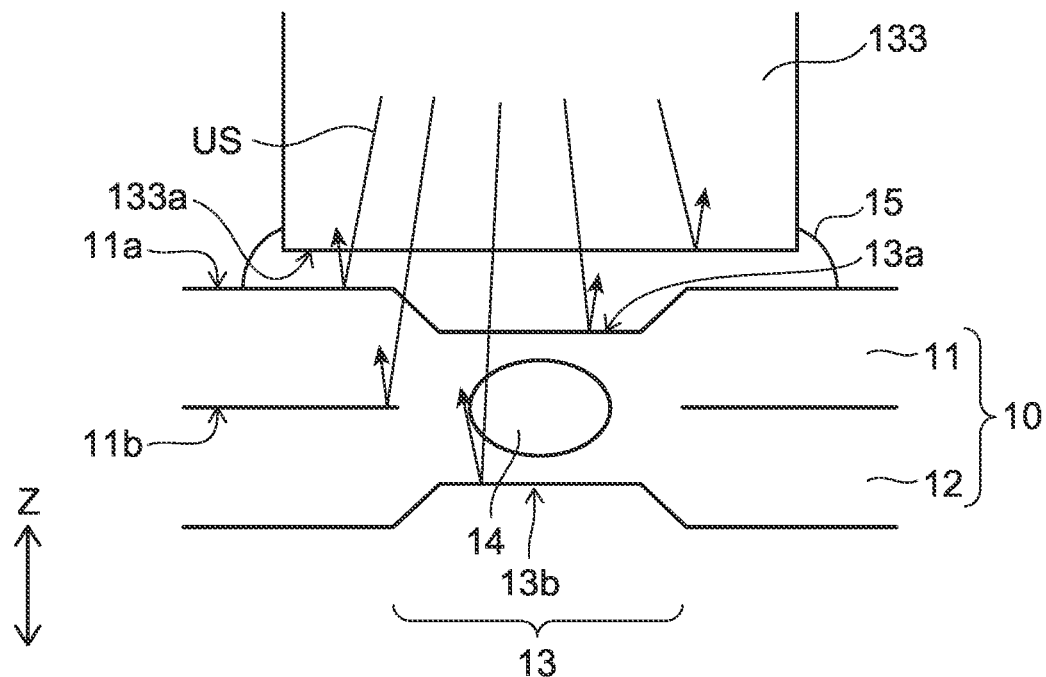
FIG. 4A
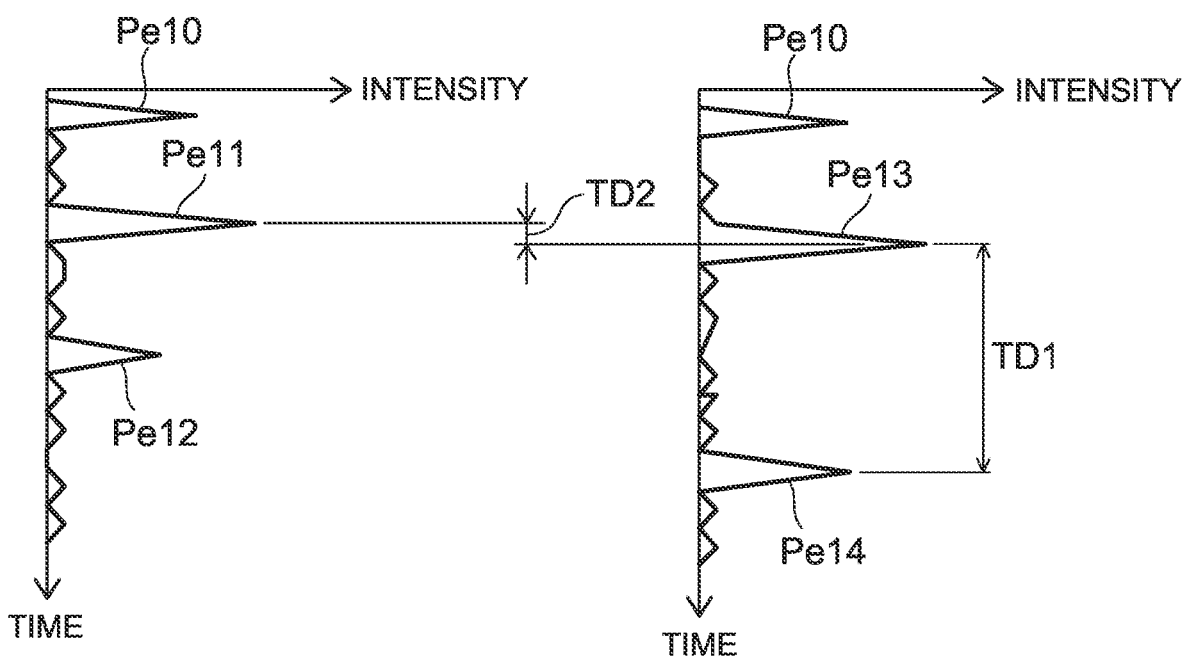
FIG. 4B
FIG. 4C

PROCESSING DEVICE, PROCESSING SYSTEM, PROCESSING METHOD, AND STORAGE MEDIUM

CROSS-REFERENCE TO RELATED APPLICATIONS

This is a continuation application of International Patent Application PCT/JP2021/021511, filed on Jun. 7, 2021. This application also claims priority to Japanese Patent Application No. 2020-099282, filed on Jun. 8, 2020. The entire contents of which are incorporated herein by reference.

FIELD

Embodiments described herein relate generally to a processing device, a processing system, a processing method, and a storage device.

BACKGROUND

In an inspection that uses an ultrasonic wave, a detector is used to transmit the ultrasonic wave and detect a reflected wave. To obtain an appropriate inspection result, it is desirable for the detector not to have an abnormality. Technology that can determine abnormalities related to the detector is desirable.

BRIEF DESCRIPTION OF THE DRAWINGS

FIGS. 4A to 4C are schematic views for describing an inspection by a processing system according to the embodiment;

DETAILED DESCRIPTION

Figure 1:
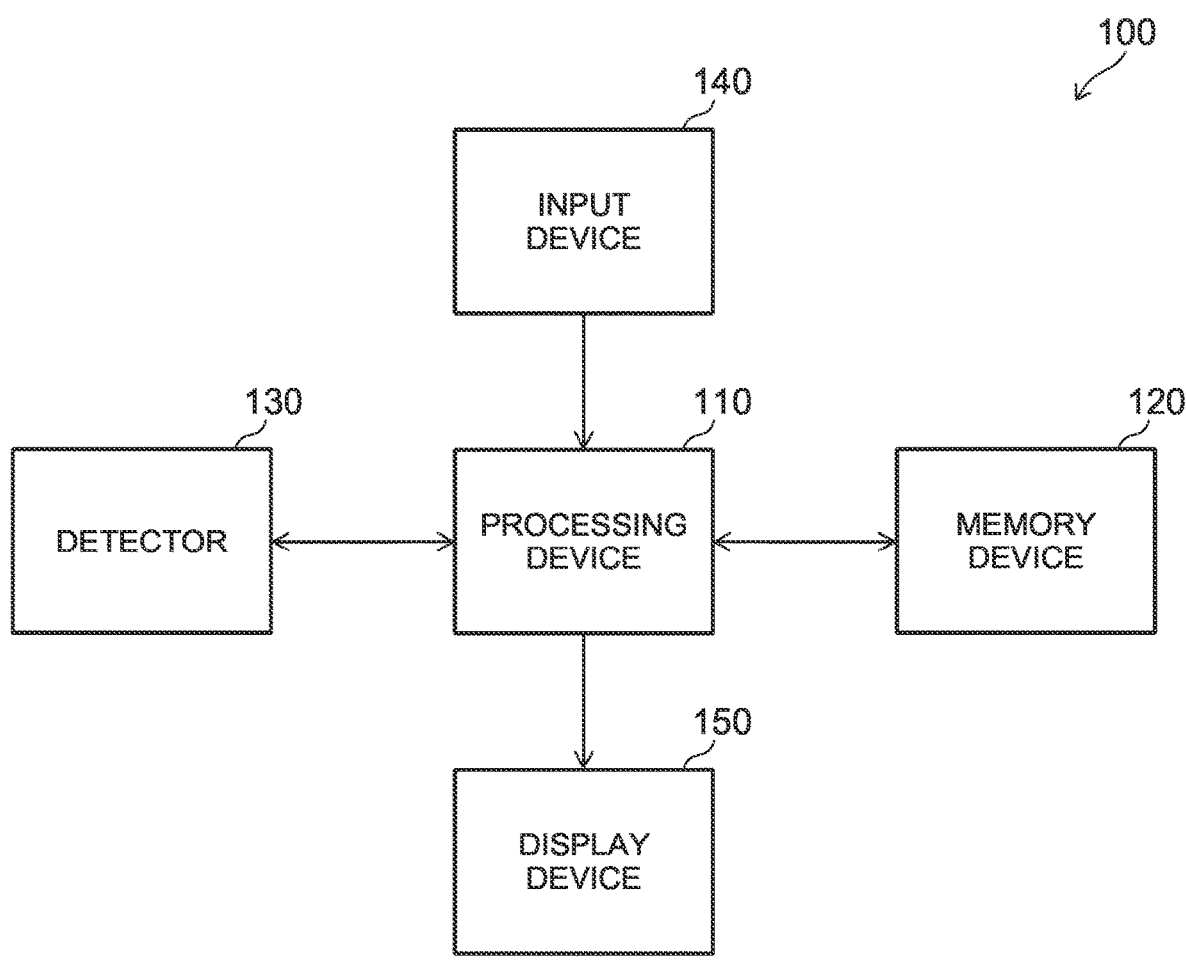
FIG. 1 is a block diagram illustrating a configuration of a processing system according to an embodiment.

According to one embodiment, a processing device receives a detection result of an intensity of a reflected wave detected by a detector including a detecting part that transmits an ultrasonic wave and receives the reflected wave, and a propagating part through which the ultrasonic wave and the reflected wave propagate, and performs a first determination of determining a state of the detecting part and a second determination of determining a state of the propagating part based on the detection result.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a block diagram illustrating a configuration of a processing system according to an embodiment.

As illustrated in FIG. 1, the processing system 100 according to the embodiment includes a processing device 110 and a memory device 120. The memory device 120 stores data related to a weld inspection. The processing device 110 processes the data related to the weld inspection.

The processing system 100 illustrated in FIG. 1 further includes a detector 130, an input device 140, and a display device 150. The detector 130 transmits an ultrasonic wave toward an object and detects (receives) the reflected wave. The detector 130 includes, for example, a probe. Hereinafter, the transmission of the ultrasonic wave and the detection of the reflected wave by the detector 130 also is called a probe (probing).

The processing device 110 performs various processing based on the detected reflected wave. For example, the processing device 110 can display a user interface in the display device 150. The user can check data obtained by the processing via the user interface displayed in the display device 150. The user can input data to the processing device 110 via the user interface by using the input device 140.

The processing device 110 is connected with the memory device 120, the detector 130, the input device 140, and the display device 150 via wired communication, wireless communication, a network, etc.

The weld inspection will be described in detail. A non-destructive inspection of the weld portion is performed in the weld inspection.

Figure 2:
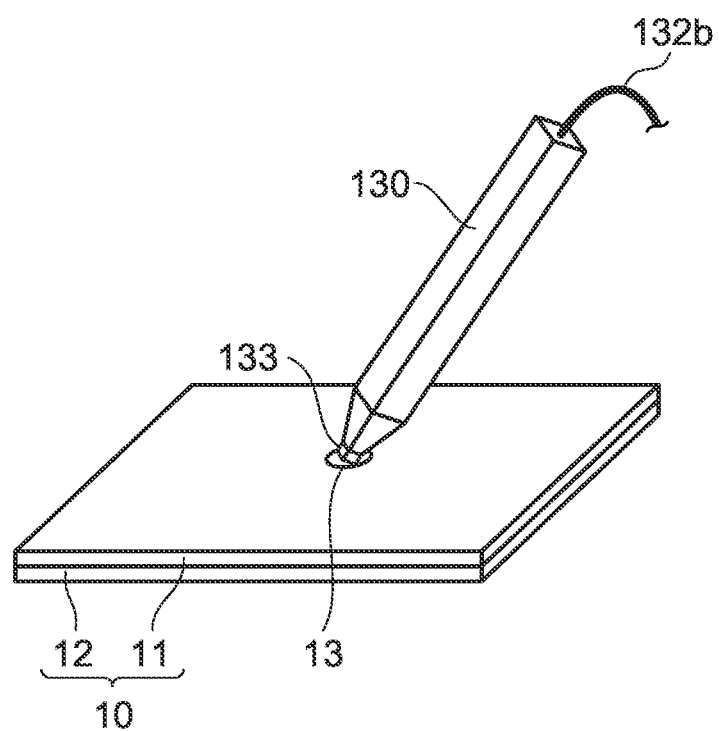
FIG. 2 is a schematic view illustrating a state of a non-destructive inspection.
Figure 3:
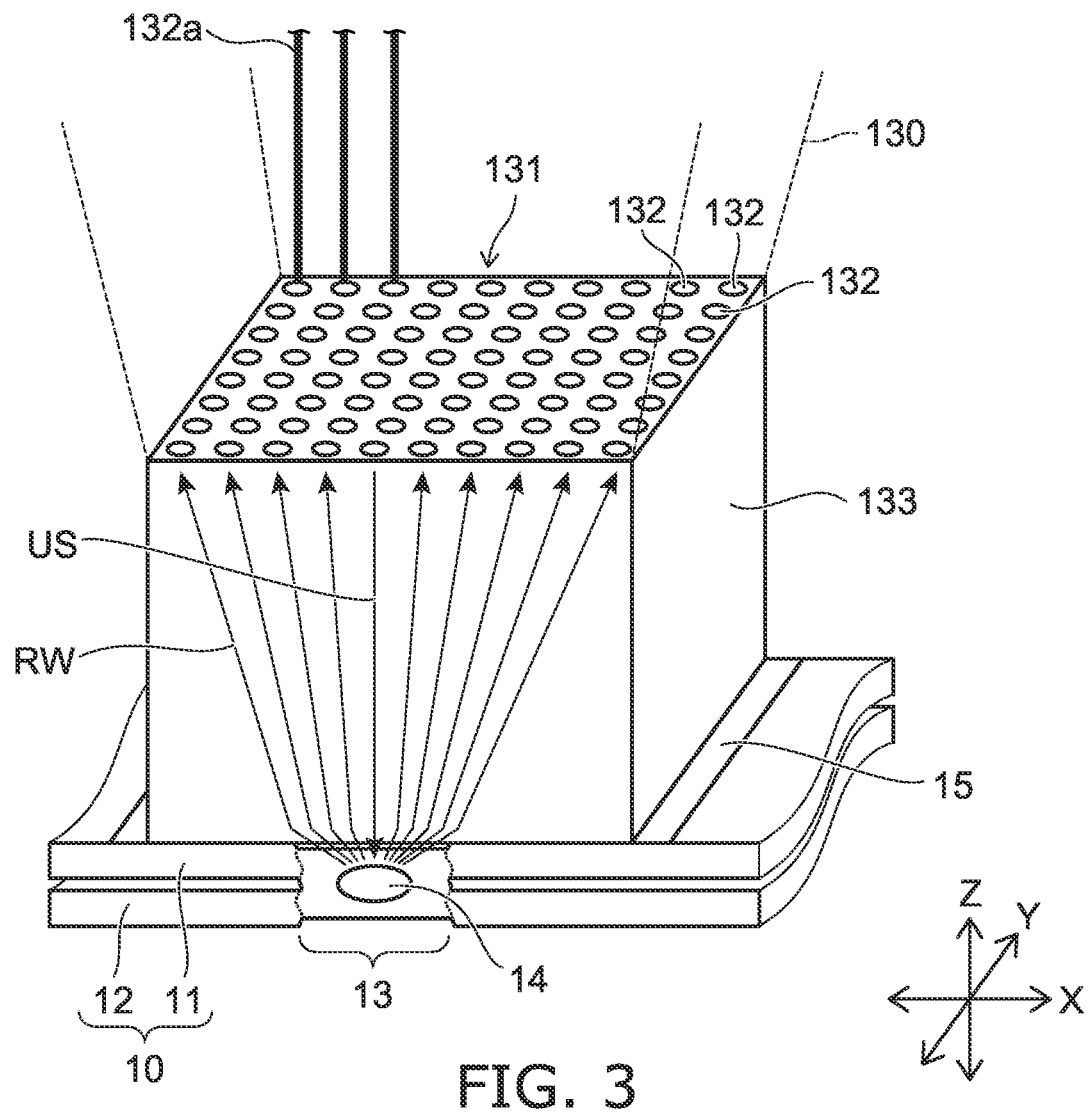
FIG. 3 is a schematic view illustrating an internal structure of a detector.

FIG. 2 is a schematic view illustrating a state of the non-destructive inspection. FIG. 3 is a schematic view illustrating the internal structure of the detector.

For example, the detector 130 has a configuration that can be gripped by the hand of a human as illustrated in FIG. 2. The human that grips the detector 130 inspects a weld portion 13 by causing the tip of the detector 130 to contact the weld portion 13.

As illustrated in FIG. 3, a detecting part 131 and a propagating part 133 are located in the detector 130. The detecting part 131 includes multiple detection elements 132. The detection element 132 is, for example, a transducer and emits an ultrasonic wave of a frequency of not less than 1 MHz and not more than 100 MHz. The multiple detection elements 132 are arranged in a first direction and a second direction that cross each other. In the example illustrated in FIG. 3, the multiple detection elements 132 are arranged in an X-direction and a Y-direction that are orthogonal to each other.

The propagating part 133 is located at the tip of the detector 130. The detecting part 131 is covered with the propagating part 133. When the tip of the detector 130 is caused to contact the weld portion 13, the propagating part 133 is positioned between the detecting part 131 and the weld portion 13. When the detecting part 131 emits an ultrasonic wave, the ultrasonic wave propagates through the propagating part 133 and is transmitted outside the detector 130. When the ultrasonic wave is reflected, the reflected wave propagates through the propagating part 133 and reaches the detecting part 131. The detecting part 131 detects the reflected wave and transmits a signal (a current) indicating the reflected wave intensity to the processing device 110. The magnitude of the current (the current value) transmitted from the detecting part 131 corresponds to the intensity of the reflected wave. The processing device 110 determines the reflected wave intensity based on the current value.

The propagating part 133 includes a resin material or the like through which the ultrasonic wave easily propagates. By providing the propagating part 133 that corresponds to the shape of the surface of the weld portion 13, the ultrasonic wave easily propagates into the interior of the weld portion 13. Deformation, damage, etc., of the detecting part 131 when the detector 130 contacts the weld portion 13 can be suppressed by the propagating part 133. The propagating part 133 has a hardness sufficient to suppress deformation, damage, etc., when contacting the weld portion 13.

As illustrated in FIG. 3, the detector 130 further includes multiple interconnects 132a. The multiple interconnects 132a are connected respectively to the multiple detection elements 132. The detection elements 132 transmit signals to the processing device 110 via the interconnects 132a. For example, as illustrated in FIG. 2, the multiple interconnects 132a are bundled as a cable 132b and connected to the processing device 110.

FIGS. 2 and 3 illustrate a state of inspecting a member 10 as the welding object. The member 10 is made by spot-welding a metal plate 11 (a first member) and a metal plate 12 (a second member) at the weld portion 13. As illustrated in FIG. 3, a solidified portion 14 is formed at the weld portion 13. The solidified portion 14 is formed by a portion of the metal plate 11 and a portion of the metal plate 12 melting, mixing, and solidifying.

For example, in the inspection, it is verified whether or not the weld portion 13 is formed. In the inspection, the diameter of the weld portion 13, whether or not the diameter is sufficient, etc. are verified. A couplant 15 is coated onto the surface of the object in the inspection so that the ultrasonic wave easily propagates between the object and the detector 130. Each of the detection elements 132 transmits an ultrasonic wave US toward the member 10 coated with the couplant 15 and detects reflected waves RW from the member 10.

For example, as illustrated in FIG. 3, one detection element 132 transmits the ultrasonic wave US toward the weld portion 13. A portion of the ultrasonic wave US is reflected by the upper surface or lower surface of the member 10, etc. The multiple detection elements 132 each receive (detect) the reflected waves RW. In the probing, the detection elements 132 sequentially transmit the ultrasonic wave US; and the reflected waves RW are detected by the multiple detection elements 132. The detector 130 transmits the detection result to the processing device 110. Or, the detector 130 may store the detection result in the memory device 120. The processing device 110 acquires the detection result and inspects the weld portion based on the detection result.

FIG. 4 is a schematic view for describing the inspection according to the processing system according to the embodiment.

As illustrated in FIG. 4A, the ultrasonic wave US is reflected by a surface 133a of the propagating part 133, an upper surface 11a and a lower surface 11b of the metal plate 11, and an upper surface 13a and a lower surface 13b of the weld portion 13.

The positions in a Z-direction of the surface 133a, the upper surface 11a, the upper surface 13a, the lower surface 11b, and the lower surface 13b are different from each other. In other words, the distances in the Z-direction between the detection element 132 and these surfaces are different from each other. The detection element 132 detects the peaks of the intensities of the reflected waves when detecting the reflected waves from these surfaces. Which surface reflected the ultrasonic wave US can be verified by calculating the time until each peak is detected after transmitting the ultrasonic wave US.

FIGS. 4B and 4C are graphs illustrating the relationship between the time after transmitting the ultrasonic wave US and the intensity of the reflected wave RW. In FIGS. 4B and 4C, the horizontal axis is the intensity of the detected reflected wave RW. The vertical axis is the elapsed time after transmitting the ultrasonic wave US. In other words, the time is the Z-direction position. The graph of FIG. 4B illustrates a detection result including the reflected waves RW from the upper surface 11a and the lower surface 11b of the metal plate 11. The graph of FIG. 4C illustrates a detection result including the reflected waves RW from the upper surface 13a and the lower surface 13b of the weld portion 13. Here, the intensity of the reflected wave RW is illustrated as an absolute value.

In the graphs of FIGS. 4B and 4C, a peak Pe10 is based on
the reflected wave RW from the surface 133a. A peak Pe11 is based on the reflected wave RW from the upper surface 11a. A peak Pe12 is based on the reflected wave RW from the lower surface 11b. The times from the transmission of the ultrasonic wave US until the peaks Pe11 and Pe12 are detected correspond respectively to the Z-direction positions of the upper surface 11a and the lower surface 11b of the metal plate 11.

Similarly, a peak Pe13 is based on the reflected wave RW from the upper surface 13a. A peak Pe14 is based on the reflected wave RW from the lower surface 13b. The times from the transmission of the ultrasonic wave US until the peaks Pe13 and Pe14 are detected correspond respectively to the Z-direction positions of the upper surface 13a and the lower surface 13b of the weld portion 13.

The processing device 110 determines whether or not the peak Pe12 exists in the Z-direction reflected wave intensity distribution at each of multiple points in the X-Y plane. Specifically, the processing device 110 detects a peak in a prescribed range in the Z-direction in which the peak Pe12 may be detected. The processing device 110 compares the intensity of the peak to a prescribed threshold. When the peak is greater than the threshold, the processing device 110 determines that the peak is the peak Pe12. The existence of the peak Pe12 indicates that the lower surface 11b exists and that the metal plates 11 and 12 are not joined. The processing device 110 determines that the points at which the peak Pe12 is detected are not joined. The processing device 110 sequentially determines whether or not each of the multiple points in the X-Y plane are joined. A cluster of points determined to be joined correspond to the weld portion 13.

The intensity of the reflected wave may be represented in any form. For example, the reflected wave intensity that is output from the detection element 132 includes positive values and negative values according to the phase. Various processing may be performed based on the reflected wave intensity including the positive values and negative values. The reflected wave intensity that includes the positive values and negative values may be converted into absolute values. The average value of the reflected wave intensities may be subtracted from the reflected wave intensity at each time. Or, the weighted average value, the weighted moving average value, or the like of the reflected wave intensities may be subtracted from the reflected wave intensity at each time. The various processing described in the application can be performed even when the results of such processing applied to the reflected wave intensity are used.

For example, the processing device 110 calculates the diameter of the weld portion 13 as the inspection result. The diameter is the length of the weld portion 13 in any one direction parallel to the X-Y plane. The processing device 110 may calculate the thickness of the weld portion 13 or the depth of the upper surface 13a of the weld portion 13 as the inspection result. The thickness of the weld portion 13 is the distance in the Z-direction between the upper surface 13a and the lower surface 13b. The thickness of the weld portion 13 can be calculated based on a time difference TD1 between the peaks Pe13 and Pe14. The depth of the upper surface 13a is the distance in the Z-direction between the upper surfaces 11a and 13a. The depth of the upper surface 13a can be calculated based on a time difference TD2 between the peaks Pe11 and Pe13. The processing device 110 may determine the appropriateness of the weld based on at least one of the diameter of the weld portion 13, the thickness of the weld portion 13, or the depth of the upper surface 13a and may output the determination result as the inspection result.

Figure 5:
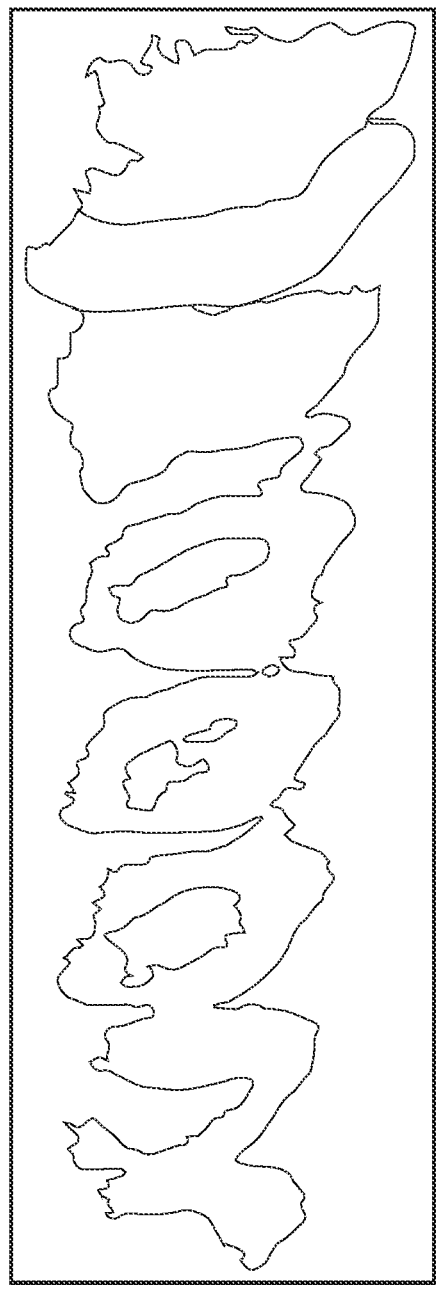
FIG. 5 is a schematic view illustrating a three-dimensional detection result obtained by the probing.
Figure 5:
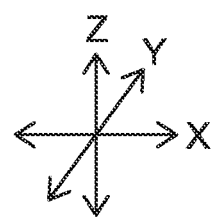

FIG. 5 is a schematic view illustrating a three-dimensional detection result obtained by probing.

In the probing as described above, the detection elements 132 sequentially transmit ultrasonic waves; and the multiple detection elements 132 detect the reflected waves. In the specific example illustrated in FIG. 3, ten detection elements 132 in the X-direction and eight detection elements 132 in the Y-direction for a total of eighty detection elements 132 are included. In such a case, the eighty detection elements 132 sequentially transmit ultrasonic waves. One detection element 132 repeatedly detects the reflected waves 80 times. The detection result of the Z-direction reflected wave intensity distribution is output 80 times from one detection element 132. The eighty reflected wave intensity distributions output from the one detection element 132 are summed. The summed intensity distribution is the intensity distribution for one probing at the coordinate at which the one detection element 132 is located. Similar processing is performed for the detection results of the eighty detection elements 132. Thereby, the Z-direction reflected wave intensity distribution is generated at each point in the X-Y plane. FIG. 5 shows an image of the three-dimensional intensity distribution. The portions of FIG. 5 at which the luminance is high are portions at which the reflected wave intensity of the ultrasonic wave is large. The three-dimensional intensity distribution data is used in the inspection.

The processing device 110 performs a first determination and a second determination as well as the inspection. In the first determination, the processing device 110 determines the state of the detecting part 131. In the second determination, the processing device 110 determines the state of the propagating part 133.

(First Determination)

Figure 6:
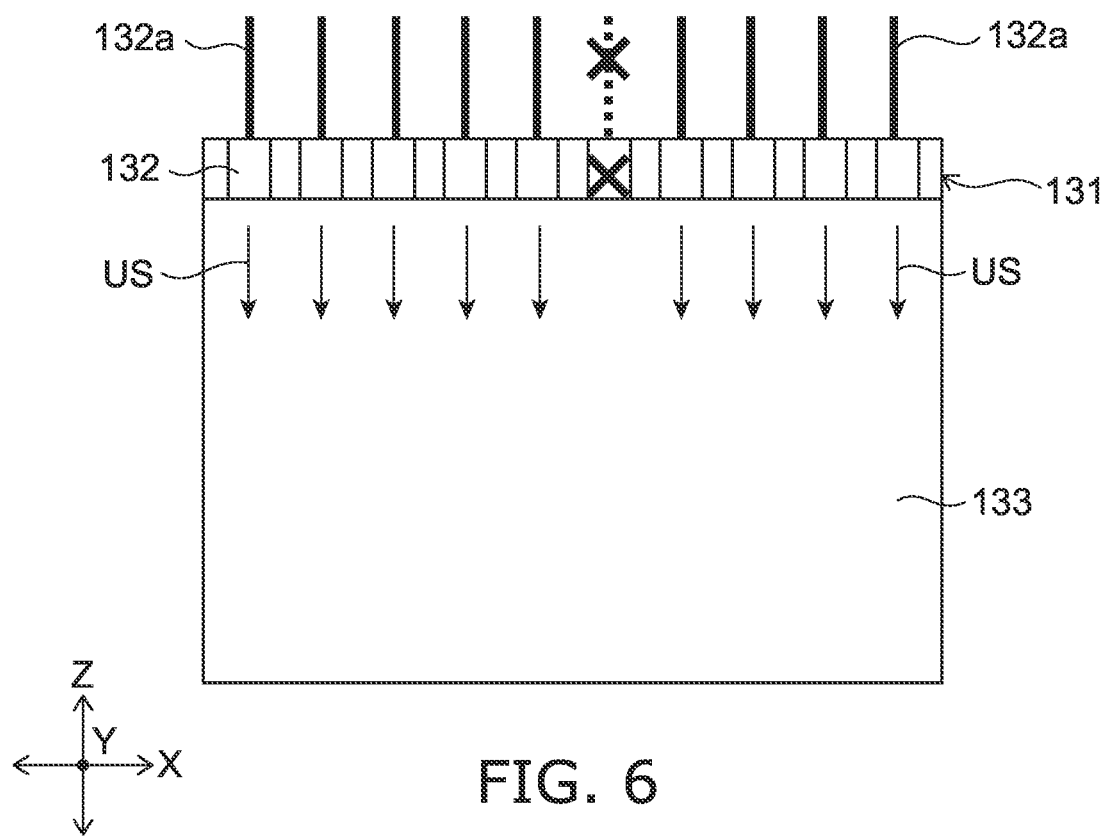
FIG. 6 is a schematic view illustrating a portion of the detector.

FIG. 6 is a schematic view illustrating a portion of the detector.

In the detecting part 131 as illustrated in FIG. 6, there are cases where an abnormality occurs in a portion of the multiple detection elements 132 or a portion of the multiple interconnects 132a. For example, the interconnect 132a may be electrically disconnected, the detection element 132 may be damaged, a connection defect may occur between the detection element 132 and the interconnect 132a, etc.; and the detection element 132 may not operate. Or, the interconnect 132a may be damaged, a connection defect may occur between the detection element 132 and the interconnect 132a, etc.; and a current that is less than the original current may flow through the detection element 132.

In such cases, such a detection element 132 or the detection element 132 that is connected with such an interconnect 132a cannot correctly transmit the ultrasonic wave or detect the reflected wave. An appropriate inspection result related to the weld portion 13 is not obtained if the detection result used in the inspection of the weld portion 13 is obtained when the detecting part 131 has an abnormality. In the first determination, the processing device 110 determines whether or not the detecting part 131 has an abnormality such as that illustrated in FIG. 6.

Figure 7:
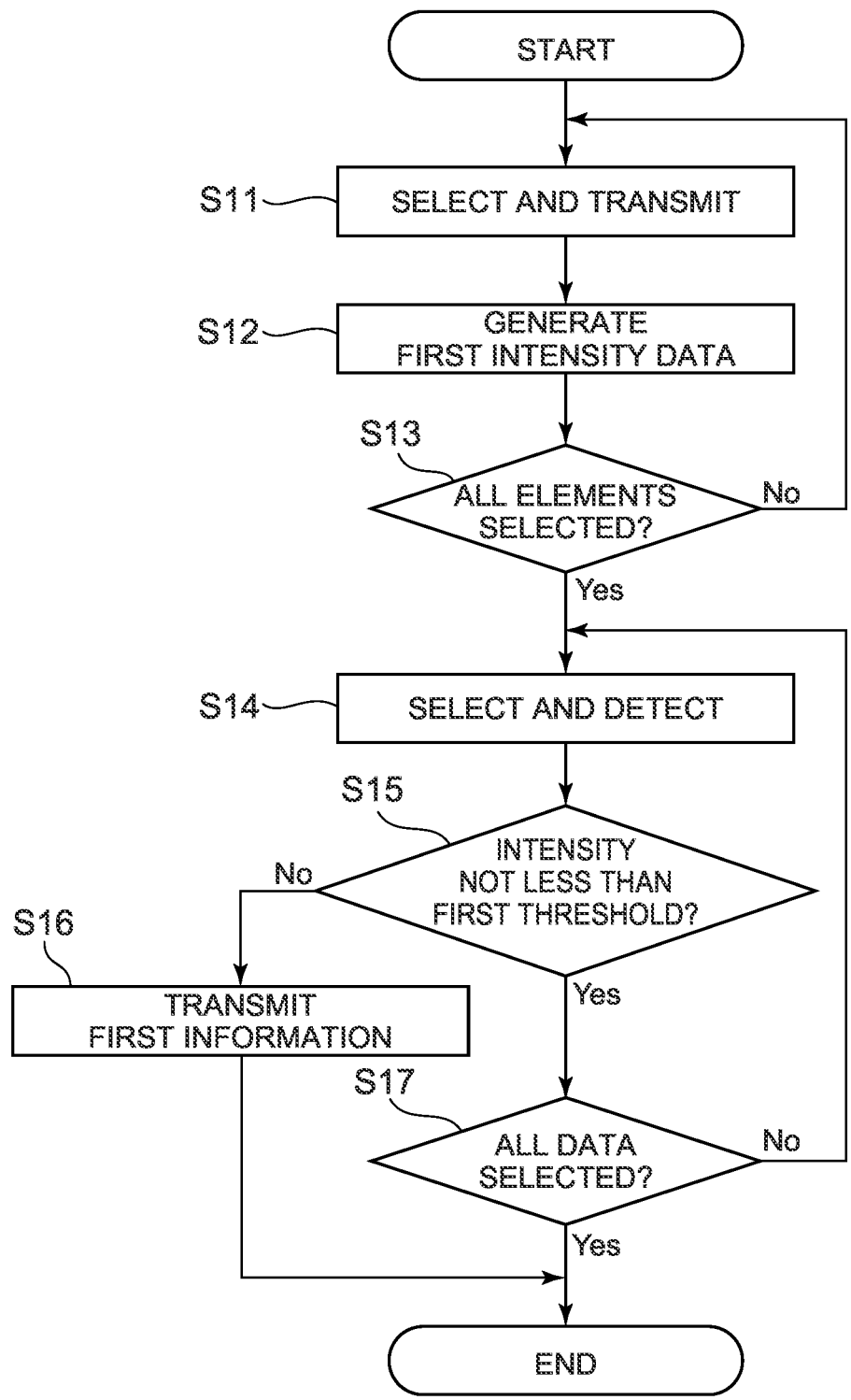
FIG. 7 is a flowchart illustrating a first determination.

FIG. 7 is a flowchart illustrating the first determination.

Figure 8:
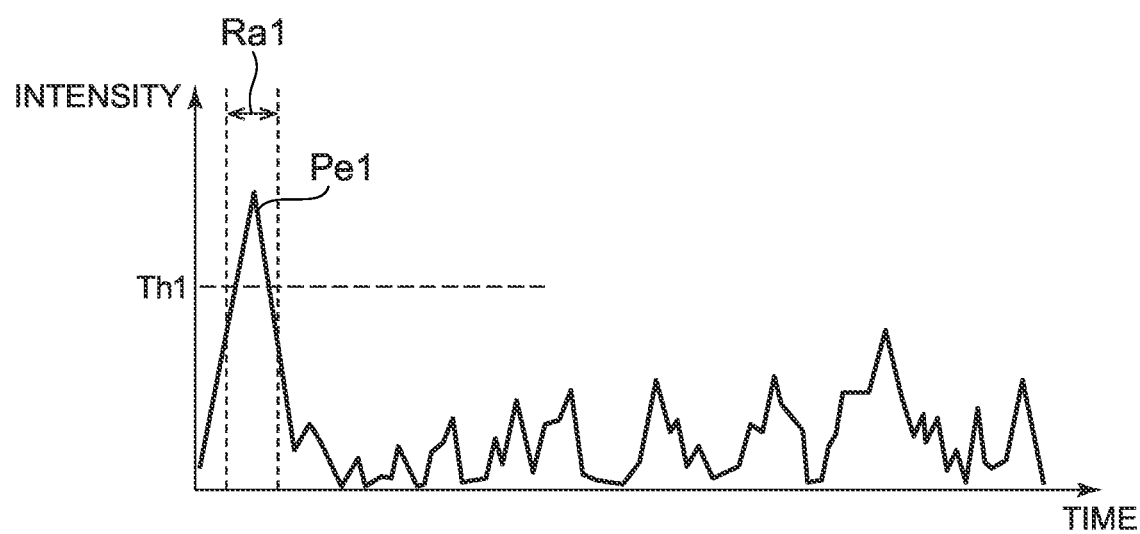
FIG. 8 is a schematic view illustrating first intensity data.

FIG. 8 is a schematic view illustrating the first intensity data.

In FIG. 8, the horizontal axis is the elapsed time after transmitting the ultrasonic wave. The vertical axis is the intensity of the reflected wave at each time. FIG. 8 illustrates the intensity as an absolute value. The intensity of the vertical axis is the summed value of the intensities detected by the detection elements 132 at each time. In other words, FIG. 8 shows how the summed value of the reflected wave intensities in the X-Y plane is distributed in the Z-direction.

In the first determination, the processing device 110 selects one detection element 132 and transmits a signal (a current) toward the detection element 132 (step S11). When receiving the signal, the selected one detection element 132 transmits an ultrasonic wave. Then, the multiple detection elements 132 detect the reflected waves. The processing device 110 receives the detection result. The processing device 110 generates the first intensity data illustrated in FIG. 8 by using the detection results of the detection elements 132 at each of multiple points in the Z-direction (step S12). For example, the first intensity data is obtained by summing multiple detection results. The average, the weighted average, etc., may be used instead of summing.

As a specific example, the eighty detection elements 132 illustrated in FIG. 3 detect the reflected waves RW when one of the eighty detection elements 132 transmits the ultrasonic wave US. The processing device 110 sums the Z-direction intensity distributions detected by the eighty detection elements 132. The first intensity data is generated thereby. The processing device 110 stores the generated first intensity data in the memory device 120.

The processing device 110 determines whether or not all of the detection elements 132 have been selected (step S13). When unselected detection elements 132 exist, step S11 is re-performed for any one of the unselected detection elements. Multiple sets of first intensity data are generated by repeating steps S11 and S12. For example, eighty sets of first intensity data are generated as each of the eighty detection elements 132 transmits the ultrasonic wave US.

When steps S11 and S12 are performed for all of the detection elements 132, the processing device 110 selects one of the multiple sets of first intensity data and detects the intensity of a portion of the reflected wave in the one set of first intensity data (step S14). For example, as illustrated in FIG. 8, a first range Ra1 of the Z-direction in which the reflected wave from the surface 133a may be detected is preset. The processing device 110 compares the intensity of the reflected wave in the first range Ra1 with a preset first threshold (step S15). When the intensity is not less than the first threshold, the processing device 110 determines the detection element 132 that transmitted the ultrasonic wave of the first intensity data to be normal. When the intensity is less than the first threshold, the processing device 110 determines the detection element 132 to be abnormal. The processing device 110 stores the determination result in the memory device 120.

As a specific example as illustrated in FIG. 8, the processing device 110 detects a first peak Pe1 that has the highest intensity within the first range Ra1. The processing device 110 compares the intensity of the first peak Pe1 with the first threshold Th1. When the intensity of the first peak Pe1 is not less than the first threshold Th1, the processing device 110 determines the detection element 132 that transmitted the ultrasonic wave when acquiring the first intensity data to be normal. When the intensity of the first peak Pe1 is less than the first threshold Th1, the processing device 110 determines the detection element 132 to be abnormal. Other than the peak intensity, the processing device 110 may determine the state of the detection element 132 by comparing the cumulative sum or the average value of the intensity in the first range Ra1 with the first threshold Th1.

When the detection element 132 is determined to be abnormal, the processing device 110 transmits first information (step S16). The first information indicates that the detecting part 131 is abnormal. When the detection element 132 is determined to be normal, the processing device 110 determines whether or not all of the sets of first intensity data have been selected (step S17). When unselected sets of first intensity data exist, step S14 is re-performed for any one unselected set of first intensity data. The processing device 110 ends the first determination after transmitting the first information or when no unselected set of first intensity data exists.

The specific content of the processing of the first determination is modifiable as appropriate. For example, in the first determination, the processing device 110 may perform steps S14 and S15 each time the first intensity data is received. When all of the detection elements 132 are determined to be normal, the processing device 110 may transmit information indicating that the detecting part 131 has no abnormality.

(Second Determination)

Figure 9:
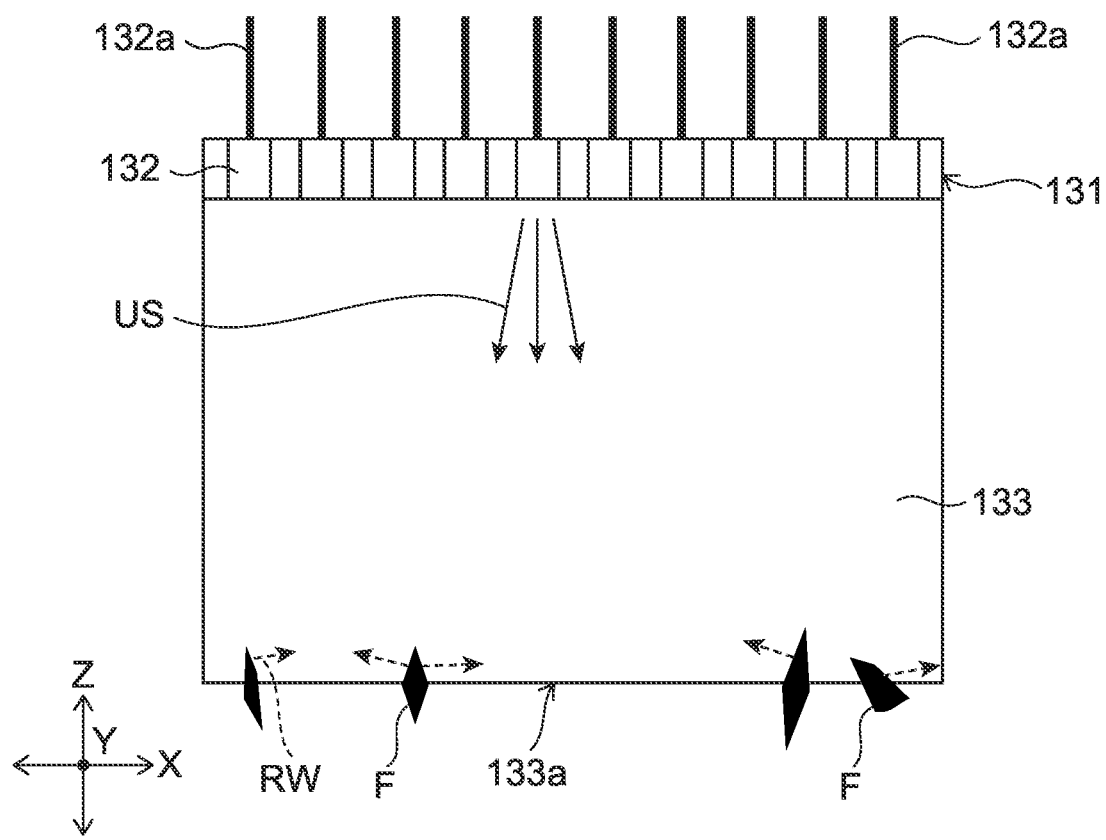
FIG. 9 is a schematic view illustrating a portion of the detector.

FIG. 9 is a schematic view illustrating a portion of the detector.

As illustrated in FIG. 9, there are cases where foreign matter F adheres to the propagating part 133 when the detector 130 is caused to contact the tip of the member 10. The foreign matter F is, for example, a metal fine particle. When the foreign matter F adheres to the propagating part 133, the ultrasonic wave US is scattered by the foreign matter F at the surface 133a of the propagating part 133. The reflected wave RW that travels toward the detecting part 131 is reduced, and the intensity of the reflected wave detected by the detecting part 131 is reduced. When a large amount of the foreign matter F adheres to the propagating part 133, the intensity of the detected reflected wave is greatly reduced. An appropriate inspection result related to the weld portion 13 is not obtained if the detection result used in the inspection of the weld portion 13 is obtained when the propagating part 133 has an abnormality. In the second determination, the processing device 110 determines whether or not the propagating part 133 has an abnormality such as that illustrated in FIG. 9.

Figure 10:
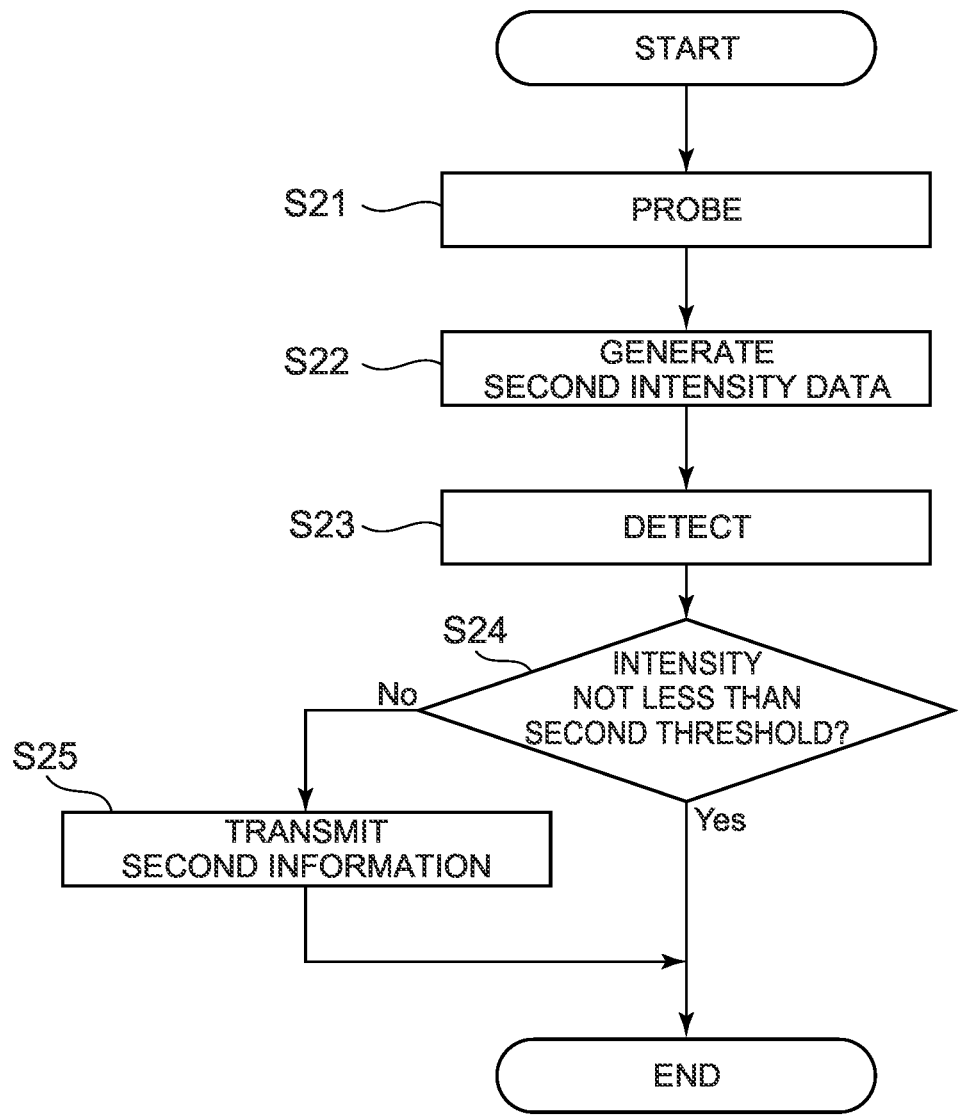
FIG. 10 is a flowchart illustrating a second determination.
Figure 11:
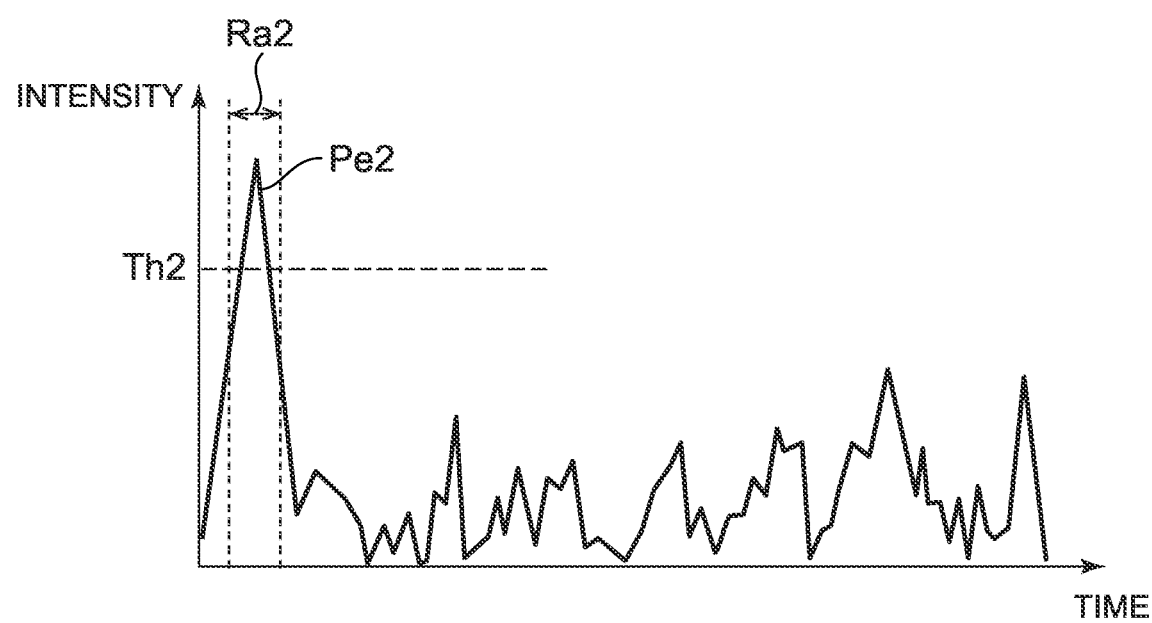
FIG. 11 is a schematic view illustrating second intensity data.

FIG. 10 is a flowchart illustrating the second determination. FIG. 11 is a schematic view illustrating second intensity data.

In FIG. 11, the horizontal axis is the elapsed time after transmitting the ultrasonic wave. The vertical axis is the intensity of the reflected wave at each time. FIG. 11 illustrates the intensity as an absolute value. The intensity of the vertical axis is the summed value of the intensities at each time for one probing.

The processing device 110 causes the detecting part 131 to probe (step S21). The processing device 110 generates the second intensity data by using the detection result obtained by the probing (step S22). The second intensity data sums at least a portion of the multiple sets of intensity data obtained by the multiple detection elements 132 detecting the reflected waves in the probing. The second intensity data may be the average or weighted average of at least a portion of the multiple sets of intensity data. Multiple sets of first intensity data may be used to generate the second intensity data. For example, the second intensity data is generated by the sum, average, or weighted average of the multiple sets of first intensity data. When the first determination is performed before the second determination, the processing device 110 may generate the second intensity data by summing the multiple sets of first intensity data obtained in the first determination. In such a case, the probing is omitted. When the second determination is performed before the first determination, the detection result that is obtained in the probing of the second determination may be used in the first determination. The time necessary for the determination can be reduced by utilizing the detection result obtained in one of the first determination or the second determination in the other of the first determination or the second determination.

As a specific example, the eighty detection elements 132 illustrated in FIG. 3 detect the reflected waves RW each time one detection element 132 transmits the ultrasonic wave US. A total of 6400 detection results are obtained by each of the eighty detection elements 132 transmitting the ultrasonic waves US. The processing device 110 sums the Z-direction intensity distributions detected by the 6400 detection elements 132. The second intensity data is generated thereby. When the first determination is performed before the second determination, the second intensity data can be generated by summing the eighty sets of first intensity data.

The processing device 110 detects the intensity of a portion of the reflected wave in the second intensity data (step S23). For example, as illustrated in FIG. 11, a second range Ra2 of the Z-direction in which the reflected wave from the surface 133a may be detected is preset. The second range Ra2 may be the same as the first range Ra1. The processing device 110 compares the intensity of the reflected wave in the second range Ra2 with a preset second threshold (step S24). When the intensity is not less than the second threshold, the processing device 110 determines the propagating part 133 to be normal. When the intensity is less than the second threshold, the processing device 110 determines the propagating part 133 to be abnormal. The processing device 110 stores the determination result in the memory device 120.

As a specific example as illustrated in FIG. 11, the processing device 110 detects a second peak Pe2 that has the highest intensity within the second range Ra2. The processing device 110 compares the intensity of the second peak Pe2 with the second threshold Th2. When the intensity of the second peak Pe2 is not less than the second threshold Th2, the processing device 110 determines the propagating part 133 to be normal. When the intensity of the second peak Pe2 is less than the second threshold Th2, the processing device 110 determines the propagating part 133 to be abnormal. Other than the peak intensity, the processing device 110 may determine the state of the propagating part 133 by comparing the cumulative sum or average value of the intensity in the second range Ra2 with the second threshold Th2.

When the propagating part 133 is determined to be abnormal, the processing device 110 transmits second information (step S25). The second information indicates that the propagating part 133 is abnormal. The processing device 110 ends the second determination after transmitting the second information or when the propagating part 133 is normal.

The specific content of the processing of the second determination is modifiable as appropriate. For example, when the propagating part 133 is determined to be normal, the processing device 110 may transmit information indicating that the propagating part 133 is not abnormal. The second intensity data may be generated using only the detection results from a portion of the detection elements 132. For example, when the foreign matter F is adhered mainly to an outer perimeter portion of the surface 133a, the second intensity data may be generated using the detection results from the detection elements 132 positioned at the outer perimeter portion of the detecting part 131.

In the first determination and the second determination, the first range Ra1 and the second range Ra2 are set based on the distance in the Z-direction between the detecting part 131 and the surface 133a of the propagating part 133. The first threshold Th1 and the second threshold Th2 are set based on the fluctuation of the detection result of the reflected wave intensity and the intensity of the reflected wave from the surface 133a when the detecting part 131 and the propagating part 133 are in the normal state.

For example, the processing device 110 outputs the first information or the second information to the display device 150. The user can check where the cause exists in the detector 130 by checking the first information or the second information displayed in the display device 150. The processing device 110 may transmit the first information or the second information to a terminal device other than the display device 150 such as a terminal device of a person performing the inspection, a manager of the welding device, etc.

The processing device 110 may output first data indicating the abnormality of the detecting part 131 together with the first information. The processing device 110 may output second data indicating the abnormality of the propagating part 133 together with the second information. The first data and the second data are, for example, the detection results of the reflected wave intensities illustrated in FIGS. 8 and 11. Or, the first data and the second data may be images of the detection results of the reflected wave intensities. The first data and the second data may be the intensities of the portions of the reflected waves detected by steps S14 and S23. Using the output of the first or second data, the user can check the basis of the processing device 110 determining the detecting part 131 or the propagating part 133 to be abnormal. The ease of use and reliability of the processing system 100 and the processing device 110 can be increased thereby.

Effects of the embodiment will now be described.

As illustrated in FIGS. 6 and 9, there are cases where an abnormality occurs in the detecting part 131 or the propagating part 133 of the detector 130. There is a possibility that an appropriate inspection result may not be obtained when performing an inspection that uses the detector 130 in a state in which an abnormality has occurred. To increase the inspection accuracy, it is desirable to perform the inspection by using a normal detector 130 without the abnormalities described above.

The regular replacement of the detecting part 131 and the propagating part 133 is an example of a method for increasing the inspection accuracy. In such a case, it is favorable for the frequency of the replacement to be high to maintain the normal state of the detector 130. On the other hand, the inspection cannot be performed while replacing. Therefore, the efficiency of the inspection is reduced when the frequency of the replacement is high. There is another method in which the user determines the existence or absence of an abnormality by checking the data of the detected reflected wave intensities. In such a case, the determination of the abnormality is dependent on the experience and/or perception of the user. The replacement of the detecting part 131 requires a longer time than the replacement of the propagating part 133. For example, if both the detecting part 131 and the propagating part 133 are replaced even though the abnormality is in the propagating part 133, the time necessary for the maintenance of the detector 130 becomes uselessly long.

The processing device 110 according to the embodiment performs the first determination and the second determination for the detector 130. By performing the first determination and the second determination, it can be verified where in the detector 130 the abnormality exists. Thereby, compared to when the detecting part 131 and the propagating part 133 are regularly replaced, the frequency of the replacement can be reduced, and the efficiency of the inspection can be increased. When one of the detecting part 131 or the propagating part 133 is determined to have an abnormality, it is sufficient for the user to replace only the one. For example, when the propagating part 133 is determined to have an abnormality, the user replaces only the propagating part 133 without replacing the detecting part 131. Therefore, the time necessary for the maintenance of the detector 130 can be reduced, and the cost of the maintenance can be reduced.

According to the method of the first determination and the method of the second determination illustrated in FIGS. 7 and 10, the abnormalities of the detecting part 131 and the propagating part 133 can be determined with higher accuracy. Therefore, the likelihood of uselessly replacing the detecting part 131 or the propagating part 133 can be reduced.

The timing at which the first determination and the second determination are performed is arbitrary. Favorably, the first determination and the second determination are performed before inspecting the weld portion 13. The accuracy of the inspection can be increased thereby.

It is favorable for the second determination to be performed after the first determination. When one of the detection elements 132 is abnormal, the summed reflected wave intensity is less than when all of the detection elements 132 are normal. Therefore, there is a possibility that the propagating part 133 may be erroneously determined to have an abnormality in the second determination. The accuracy of the determination of the second determination can be increased by performing the second determination after the detecting part 131 is determined to be normal. When the detecting part 131 is determined to be abnormal, the second determination is performed after replacing the detecting part 131. The first determination may be re-performed after replacing the detecting part 131 and before the second determination.

For example, the first determination and the second determination are performed in a state in which the detector 130 is separated from another member. When the propagating part 133 contacts another member, the reflected wave intensity from the surface 133a changes according to the characteristics of the contacting member. Thereby, there is a possibility that an erroneous determination result may be output in the first and second determinations. When the first determination and the second determination are performed in a state in which the detector 130 is separated from other members, the first threshold Th1 and the second threshold Th2 are set based on the reflected wave intensity from the surface 133a in that state.

Or, a specific member may be prepared for the first determination and the second determination. The first determination and the second determination are performed in a state in which the detector 130 contacts the member. The detector 130 may contact another member when performing the first determination and the second determination as long as the reflected wave intensity from the surface 133a can be stabilized.

For example, after the first determination and the second determination, the detector 130 is caused to contact the weld portion of an inspection object; and the weld portion is probed. Third intensity data that indicates the intensity of the reflected wave from the weld portion is acquired by the probing. The third intensity data is three-dimensional data as illustrated in FIG. 5. The processing device 110 inspects the weld portion by using the third intensity data.

MODIFICATIONS

The inspection of the weld portion described above may be automatically performed by a robot.

Figure 12:
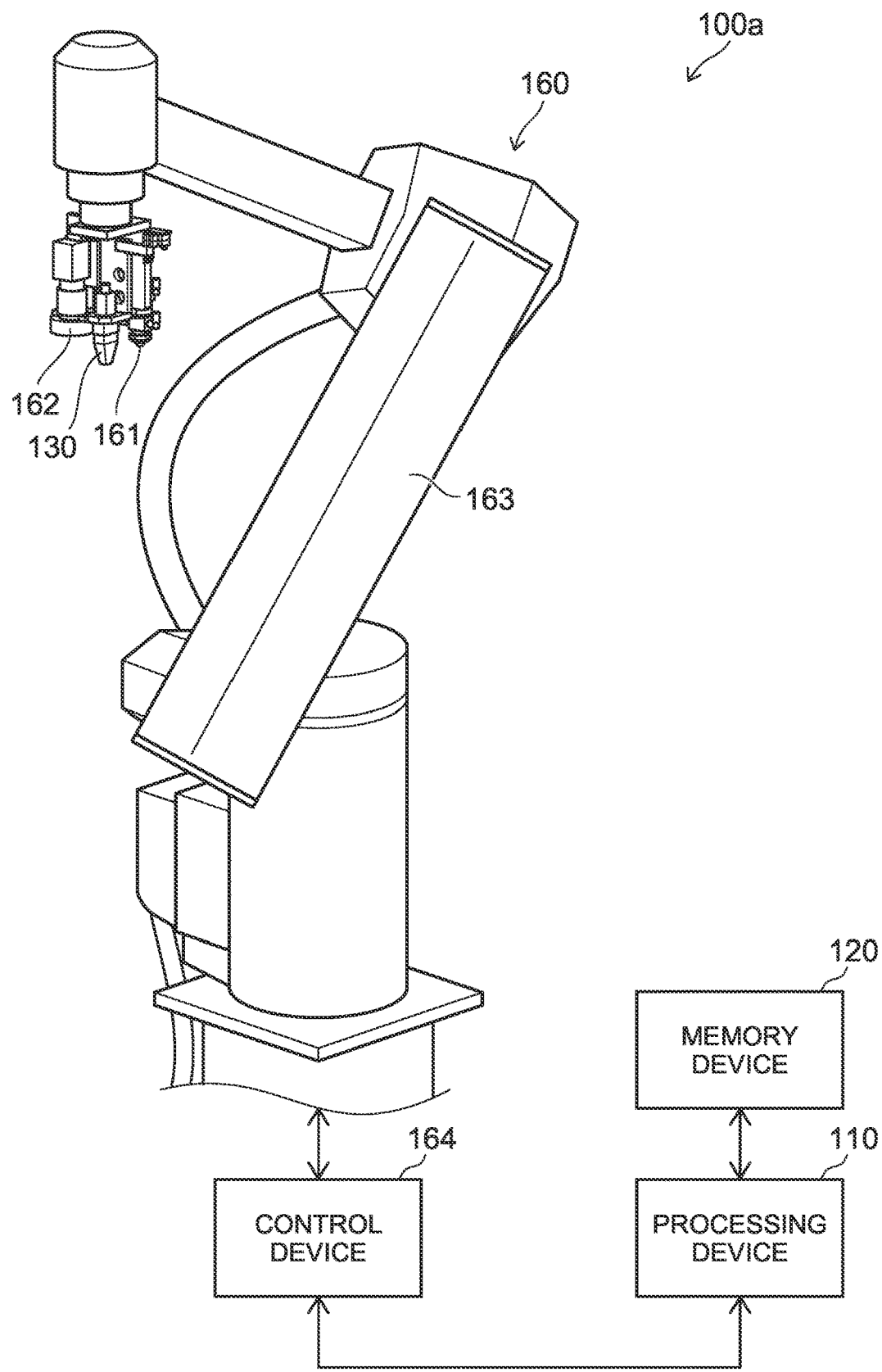
FIG. 12 is a schematic view illustrating the configuration of a processing system according to a modification of the embodiment.

FIG. 12 is a schematic view illustrating a configuration of a processing system according to a modification of the embodiment.

Figure 13:
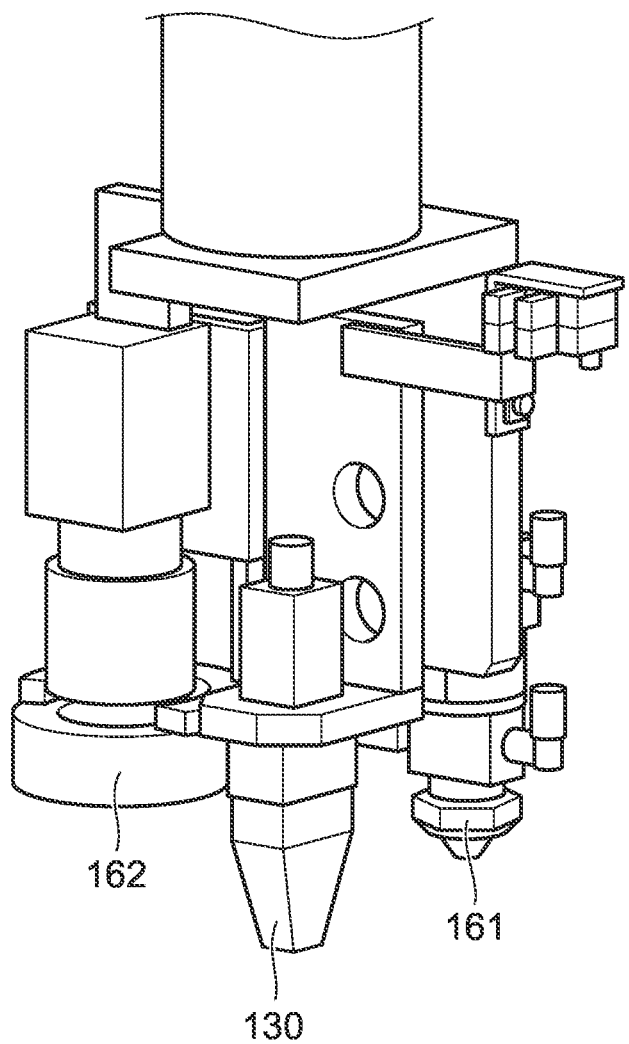
FIG. 13 is a perspective view illustrating a portion of the processing system according to the modification of the embodiment.

FIG. 13 is a perspective view illustrating a portion of the processing system according to the modification of the embodiment.

The processing system 100a illustrated in FIG. 12 includes the processing device 110 and a robot 160. The robot 160 includes the detector 130, an imaging device 161, a coating device 162, a manipulator 163, and a control device 164.

The imaging device 161 acquires an image by imaging the welded members. The imaging device 161 extracts a weld mark from the image and detects roughly the position of the weld portion 13. The coating device 162 coats a couplant onto the upper surface of the weld portion 13.

The detector 130, the imaging device 161, and the coating device 162 are located at the distal end of the manipulator 163 as illustrated in FIG. 13. The manipulator 163 is vertical articulated, horizontal articulated, or parallel link. The detector 130, the imaging device 161, and the coating device 162 can be displaced by driving the manipulator 163. The control device 164 controls the operation of the manipulator 163. The control device 164 is a so-called robot controller.

The operations of the detector 130, the imaging device 161, and the coating device 162 are controlled by the processing device 110 or the control device 164.

Figure 14:
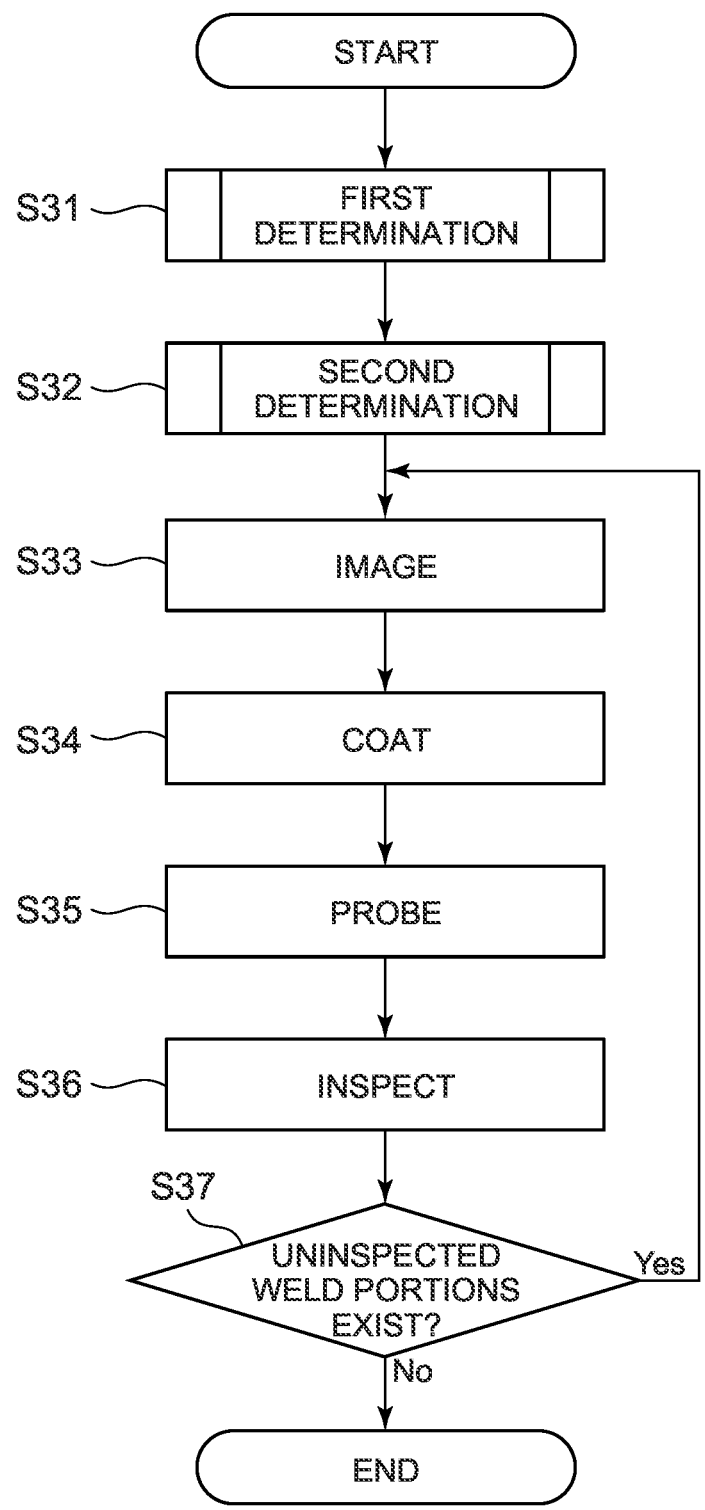
FIG. 14 is a flowchart illustrating an operation of the processing system according to the modification of the embodiment.

FIG. 14 is a flowchart illustrating an operation of the processing system according to the modification of the embodiment.

First, the processing device 110 performs the first determination and the second determination (steps S31 and S32). The processing device 110 transmits the coordinates of the weld portion 13 stored in the memory device 120 to the control device 164. The control device 164 moves the distal end of the manipulator 163 toward the received coordinates by driving the manipulator 163. When the detector 130 is moved to the vicinity of the received coordinates, the imaging device 161 images the member 10; and the detailed position of the weld portion 13 is detected using the acquired image (step S33).

The control device 164 moves the coating device 162 to the vicinity of the detected position by driving the manipulator 163. The coating device 162 coats the couplant onto the weld portion 13 (step S34). The control device 164 drives the manipulator 163 and moves the detector 130 so that the tip of the detector 130 contacts the weld portion 13 coated with the couplant. When the tip of the detector 130 contacts the weld portion 13 via the couplant, the processing device 110 causes the detector 130 to probe (step S35).

The processing device 110 inspects the weld portion 13 based on the detection result (the third intensity data) obtained by the probing (step S36). The processing device 110 determines whether or not an uninspected weld portion 13 exists (step S37). When an uninspected weld portion 13 exists, the processing device 110 transmits the coordinates of the uninspected weld portion 13 to the control device 164. The control device 164 moves the distal end of the manipulator 163 toward the received coordinates by driving the manipulator 163. Step S33 is re-performed for the uninspected weld portion 13.

The first determination and the second determination may be performed while driving the manipulator 163 to perform step S33. Thereby, an abnormality of the detecting part 131 or the propagating part 133 can be more promptly discovered even when the abnormality of the detecting part 131 or the propagating part 133 occurs while driving the manipulator 163, while probing the detector 130, etc.

When the detecting part 131 or the propagating part 133 is determined to have an abnormality by the first or second determination, the processing device 110 may transmit a signal (the first information or the second information) to the control device 164. When receiving the signal, the control device 164 stops the manipulator 163. The control device 164 may stop the manipulator 163 after moving the distal part of the manipulator 163 to a preset position.

Figure 15:
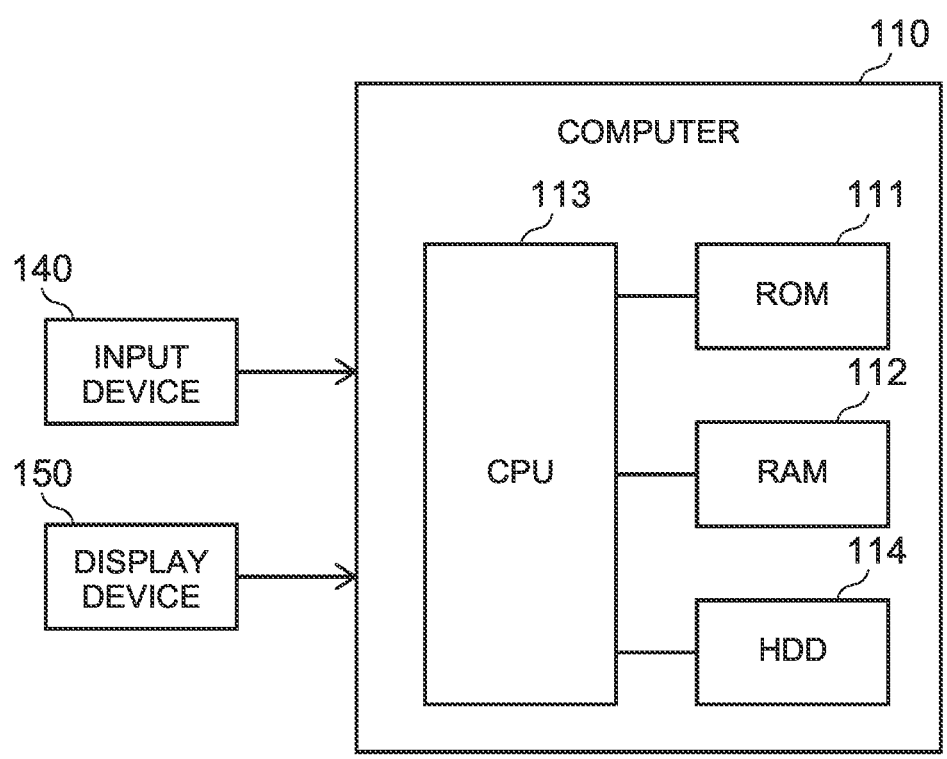
FIG. 15 is a block diagram illustrating a hardware configuration of the processing device.

FIG. 15 is a block diagram illustrating a hardware configuration of the processing device.

For example, the processing device 110 according to the embodiment is a computer and includes ROM (Read Only Memory) 111, RAM (Random Access Memory) 112, a CPU (Central Processing Unit) 113, and a HDD (Hard Disk Drive) 114.

The ROM 111 stores programs controlling the operations of the computer. The ROM 111 stores programs necessary for causing the computer to realize the processing described above.

The RAM 112 functions as a memory region where the programs stored in the ROM 111 are loaded. The CPU 113 includes a processing circuit. The CPU 113 reads a control program stored in the ROM 111 and controls the operation of the computer according to the control program. The CPU 113 loads various data obtained by the operation of the computer into the RAM 112. The HDD 114 stores data necessary for reading and/or data obtained in the reading process. For example, the HDD 114 functions as the memory device 120 illustrated in FIG. 1.

Instead of the HDD 114, the processing device 110 may include an eMMC (embedded Multi Media Card), a SSD (Solid State Drive), a SSHD (Solid State Hybrid Drive), etc.

The processing and functions of the processing device 110 may be realized by collaboration between more computers.

The input device 140 includes at least one of a mouse, a keyboard, or a touchpad. The display device 150 includes at least one of a monitor or a projector. A device such as a touch panel that functions as both the input device 140 and the display device 150 may be used.

In the example above, a spot-welded weld portion 13 is inspected by the processing system 100 or 100a. The welding method is not limited to the example; a member that is welded using another method may be inspected by the processing system 100 or 100a. For example, the processing system 100 or 100a may inspect a member that is arc-welded, laser-welded, or seam-welded. A non-destructive inspection that uses the detector 130 is possible for members welded by these methods as well.

The detector 130 also is applicable to a non-destructive inspection other than a welded member. In such a case as well, the inspection can be performed with higher accuracy by investigating the abnormality of the detector 130 by using the first and second determinations.

According to the processing device, the processing system, or the processing method described above, an abnormality related to the detector can be determined with higher accuracy. Similar effects can be obtained by using a program for causing a computer to operate as the processing device described above.

The processing of the various data described above may be recorded, as a program that can be executed by a computer, in a non-transitory computer-readable storage medium (non-transitory computer-readable storage medium) such as magnetic disk (a flexible disk, a hard disk, etc.), an optical disk (CD-ROM, CD-R, CD-RW, DVD-ROM, DVD±R, DVD±RW, etc.), semiconductor memory, etc.

For example, the data that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

While certain embodiments of the inventions have been illustrated, these embodiments have been presented by way of example only, and are not intended to limit the scope of the inventions. These novel embodiments may be embodied in a variety of other forms; and various omissions, substitutions, modifications, etc., can be made without departing from the spirit of the inventions. These embodiments and their modifications are within the scope and spirit of the inventions, and are within the scope of the inventions described in the claims and their equivalents. The embodiments described above can be implemented in combination with each other.

What is claimed is:

1. A processing system, comprising:
a detector including
a detecting part configured to transmit an ultrasonic wave and detect a reflected wave, and
a propagating part through which the ultrasonic wave and the reflected wave propagate; and
a processing device configured to
receive a detection result of an intensity of the reflected wave detected in a state where the detector is separated from any other member,
perform a first determination of determining a state of the detecting part based on the detection result, and
perform a second determination of determining a state of the propagating part.

2. The processing system according to claim 1, wherein when the first determination determines the detecting part to have an abnormality, the processing device outputs first information indicating the abnormality of the detecting part, and
when the second determination determines the propagating part to have an abnormality, the processing device outputs second information indicating the abnormality of the propagating part.

3. The processing system according to claim 1, wherein the detecting part includes a plurality of detection elements configured to transmit the ultrasonic waves and detecting the reflected waves,
the detection result includes intensity data,
the intensity data is a sum of at least a portion of a plurality of sets of other intensity data obtained by the plurality of detection elements detecting the reflected waves,
the second determination is performed by comparing an intensity of a portion of the reflected wave in the intensity data with a second threshold, and
the second threshold is preset.

4. The processing system according to claim 1, wherein the detecting part includes a plurality of detection elements configured to transmit the ultrasonic waves and detecting the reflected waves,
the detection result includes a plurality of sets of intensity data obtained by the plurality of detection elements sequentially transmitting the ultrasonic waves and by the plurality of detection elements detecting the reflected waves,
the first determination is performed by comparing the intensity of a portion of the reflected wave with a first threshold for each of the plurality of sets of intensity data, and the first threshold is preset.

5. The processing system according to claim 4, wherein the second determination is performed by comparing an intensity of a portion of the reflected wave in other intensity data with a second threshold,
the other intensity data is generated using the plurality of sets of intensity data, and
the second threshold is preset.

6. The processing system according to claim 1, wherein the processing device is configured to inspect a weld portion based on intensity data when receiving the intensity data, and
the intensity data is obtained by the detecting part transmitting the ultrasonic wave toward the weld portion and detecting the reflected wave from the weld portion.

7. The processing system according to claim 1, wherein the propagating part includes a resin material.

8. The processing system according to claim 1, further comprising:
a manipulator; and
a control device controlling the manipulator,
the detector being located at a distal part of the manipulator.

9. The processing system according to claim 8, wherein the control device is configured to stop the manipulator when the processing device determines the detecting part to have an abnormality in the first determination or determines the propagating part to have an abnormality in the second determination.

10. The processing system according to claim 8, wherein the first determination and the second determination are performed in the state in where detector is separated from any other member.

11. The processing system according to claim 8, wherein the first determination and the second determination are performed while moving the manipulator.

12. A processing system, comprising:
a detector including
   a detecting part including a plurality of detection elements and configured to transmit an ultrasonic wave and detect a reflected wave, the plurality of detection elements being configured to transmit ultrasonic waves and detecting reflected waves, a plurality of sets of intensity data being obtained by the plurality of detection elements sequentially transmitting the ultrasonic waves and by the plurality of detection elements detecting the reflected waves, and
   a propagating part through which the ultrasonic wave and the reflected wave propagate; and
a processing device configured to
   receive the plurality of sets of intensity data detected in a state where the detector is separated from any other member, and
   determine a state of the detecting part by comparing an intensity of a portion of the reflected wave with a threshold for each of the plurality of sets of intensity data, the threshold being preset.

13. A processing system, comprising:
a detector including
   a detecting part configured to transmit an ultrasonic wave and detect a reflected wave, and
   a propagating part through which the ultrasonic wave and the reflected wave propagate; and
a processing device configured to
   receive a detection result of an intensity of a reflected wave detected in a state where the detector is separated from any other member, and
   determine a state of the propagating part by comparing an intensity of a portion of the reflected wave with a threshold, the threshold being preset.

14. A processing method, comprising:
receiving a detection result of an intensity of a reflected wave detected by a detector, the detector including a detecting part and a propagating part, the detecting part transmitting an ultrasonic wave and detecting the reflected wave, the ultrasonic wave and the reflected wave propagating through the propagating part, the detection result being detected in a state where the detector is separated from any other member; and
performing, based on the detection result:
   a first determination of determining a state of the detecting part; and
   a second determination of determining a state of the propagating part.

15. The processing method according to claim 14, wherein
the first determination and the second determination are performed in the state where the detector is separated from any other member.

16. The processing method according to claim 14, wherein
a weld portion is inspected based on intensity data when the intensity data is received, and
the intensity data is obtained by the detecting part transmitting the ultrasonic wave toward the weld portion and detecting the reflected wave from the weld portion.

17. A non-transitory computer-readable storage medium storing a program,
the program causing a computer to:
   receive a detection result of an intensity of a reflected wave detected by a detector, the detector including
      a detecting part transmitting an ultrasonic wave and detecting the reflected wave, and
      a propagating part through which the ultrasonic wave and the reflected wave propagate; and
   performing, based on the detection result detected in a state where the detector is separated from any other member,
      a first determination of determining a state of the detecting part, and
      a second determination of determining a state of the propagating part.

18. The medium according to claim 17, wherein
the computer is caused to receive intensity data and inspect a weld portion based on the intensity data, and
the intensity data is obtained by the detecting part transmitting the ultrasonic wave toward the weld portion and detecting the reflected wave from the weld portion.

* * * * *